(12) United States Patent
Montvay

(10) Patent No.: US 9,239,577 B2
(45) Date of Patent: Jan. 19, 2016

(54) METHOD AND DEVICE FOR CARRYING OUT AN ONBOARD DIAGNOSIS

(75) Inventor: Andras Montvay, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 881 days.

(21) Appl. No.: 13/517,907

(22) PCT Filed: Dec. 6, 2010

(86) PCT No.: PCT/EP2010/068970
§ 371 (c)(1),
(2), (4) Date: Sep. 12, 2012

(87) PCT Pub. No.: WO2011/076551
PCT Pub. Date: Jun. 30, 2011

(65) Prior Publication Data
US 2012/0330530 A1    Dec. 27, 2012

(30) Foreign Application Priority Data
Dec. 22, 2009  (DE) .......................... 10 2009 055 120

(51) Int. Cl.
*F02D 41/22* (2006.01)
*G05B 23/02* (2006.01)
*F02D 41/24* (2006.01)

(52) U.S. Cl.
CPC .......... *G05B 23/0256* (2013.01); *F02D 41/221* (2013.01); *F02D 41/2438* (2013.01);
(Continued)

(58) Field of Classification Search
CPC ............ F02D 41/2464; F02D 41/2477; F02D 41/221; F02D 41/2438; G05B 23/0256

USPC .................................................. 701/102, 114
See application file for complete search history.

(56) References Cited

U.S. PATENT DOCUMENTS 5,419,186 A * 5/1995 Janetzke ............... F02D 11/107
                                                73/114.13
5,511,412 A * 4/1996 Campbell, III ....... F02D 31/004
                                                73/114.25
(Continued)

FOREIGN PATENT DOCUMENTS

CN    100554656    10/2009
DE    44 18 010    11/1995
(Continued)

OTHER PUBLICATIONS

International Search Report, PCT International Application No. PCT/EP2010/068970, dated Jun. 7, 2011.

*Primary Examiner* — Erick Solis
(74) *Attorney, Agent, or Firm* — Kenyon & Kenyon LLP

(57) ABSTRACT

A method for checking a function of an actuator or a sensor of a system, having the following steps: controlling the actuator within a time window if at least one state variable of the system is in a predefined operating range; detecting a system response, with the aid of the sensor, within the time window as a response to controlling the actuator; determining a malfunction of the actuator or of the sensor if the system response differs from a setpoint system response that is expected due to controlling the actuator. A further actuator of the system is controlled during the time window in such a way that the at least one state variable of the system remains in the predefined operating range during the time window. Moreover, a corresponding method for calibrating a sensor or an actuator of a system is described.

21 Claims, 2 Drawing Sheets

(52) U.S. Cl.
CPC ........ *F02D41/2464* (2013.01); *F02D 41/2474* (2013.01); *F02D 41/2477* (2013.01); *F02D 2250/14* (2013.01); *Y02T 10/40* (2013.01)

(56) References Cited

U.S. PATENT DOCUMENTS

| | | | |
|---|---|---|---|
| 5,604,305 | A | 2/1997 | Denz et al. |
| 6,024,075 | A | 2/2000 | Bidner et al. |
| 6,799,454 | B2 * | 10/2004 | Birkner .................. F02B 47/08 73/114.32 |
| 7,694,936 | B2 * | 4/2010 | Hoffmann ........... F16K 37/0083 251/129.04 |
| 2003/0115944 | A1 * | 6/2003 | Martin ................ F02D 41/0087 73/114.47 |
| 2009/0314073 | A1 * | 12/2009 | Perryman ........... F02D 41/2096 73/114.45 |
| 2010/0031738 | A1 * | 2/2010 | Feldkamp ........... G01M 15/042 73/114.79 |

FOREIGN PATENT DOCUMENTS

| | | |
|---|---|---|
| DE | 196 20 038 | 11/1997 |
| DE | 199 23 475 | 12/1999 |
| DE | 102 20 223 | 12/2003 |
| EP | 1 426 575 | 6/2004 |

* cited by examiner

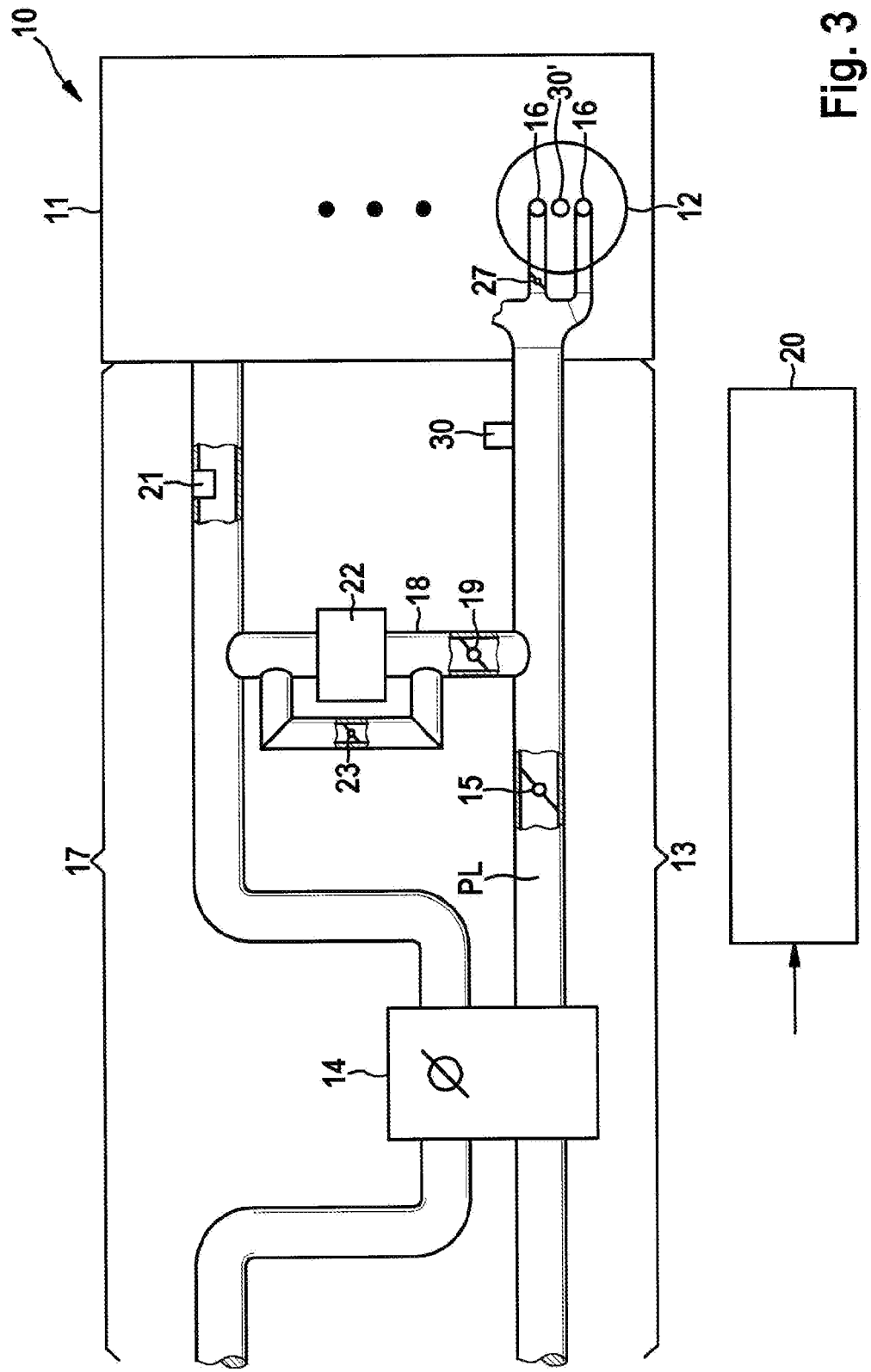

METHOD AND DEVICE FOR CARRYING OUT AN ONBOARD DIAGNOSIS

FIELD OF THE INVENTION

The present invention relates to the field of diagnostic and balancing methods for a system component in a system, in particular the field of onboard diagnostic methods for engine systems for motor vehicles.

BACKGROUND INFORMATION

In order to check the functionality of system components, for example actuators, in complex systems, so-called intrusive tests are frequently conducted. These intrusive tests are often regularly carried out when certain predefined enabling conditions for conducting these tests are met. During operation of the system, when the enabling conditions are present an actuator is activated or adjusted, and one or multiple sensor variables is/are observed. If the expected response to activation of the actuator does not occur, a defect in the actuator or some other system component may be deduced.

In particular in engine systems of motor vehicles, these function tests are carried out within the scope of an onboard diagnosis for a majority of the actuators used therein. For example, in a coasting mode in which no fuel is injected into the internal combustion engine, a function check of the actuator for adjusting the swirl flap may be carried out. In this check, the position of the swirl flap in an air supply system of the internal combustion engine is varied, and the resulting change in pressure in the intake manifold of the air supply system or the change in the fresh air mass flow is measured. If there is no change in pressure, or if the expected change in pressure as the result of adjusting the swirl flap does not occur, a defect in the swirl flap may be deduced.

To allow a robust diagnosis, it is necessary for a predefined system state to be maintained for a given function test. The predefined system state may be defined by state variable ranges for state variables, it being possible for an enabling condition to include, for example, that a state variable must be within a state variable range or remain constant while the function test is carried out, since a change in the state variable would distort the test result. In the previous function checks of system components, during the course of the function test it is observed whether the necessary enabling conditions are met, and if applicable, the function test is terminated and the result is discarded. Depending on the selection of the state variable ranges, this may possibly result in frequent terminations of test runs, which is disadvantageous due to the fact that a function test has a negative influence, i.e., represents a disturbance. Frequently terminated test runs thus result in a high degree of negative influence on the overall system.

Correspondingly, the state variable ranges defined by the enabling condition should be selected to be relatively large so that there is a sufficiently high probability that the function test may, with a certain likelihood, be carried out to the end in the operated system. However, this may result in the function tests also having to be carried out in operating ranges in which the activation of the actuator to be tested, in order to check its function, causes a greater effect on the system.

Similar difficulties exist for balancing or calibrating of a system component which likewise is to be carried out regularly and/or under certain operating conditions. A property of a system component, for example a sensor variable of a sensor, is ascertained in a certain operating range, and an interpretation of the corresponding sensor variable is adapted in a control unit. Similarly, a physical output variable of an actuator may be ascertained regularly and/or under certain operating conditions as a function of a control of the actuator in order to appropriately adapt the output of the control variable by a control unit. In these cases as well, the balancing or the calibration must be terminated if the state variable range defined by the enabling condition is departed from prematurely, i.e., during ascertainment of the sensor variable or the physical output variable.

An object of the present invention is to provide a method and a device for carrying out a function check and/or a balancing or a calibration of a system component in a system, on the one hand the robustness of the function check or of the balancing being increased, and/or on the other hand the negative influences on the system being kept as low as possible during the adjustment of the actuator.

SUMMARY

According to a first aspect of the present invention, an example method is provided for checking a function of an actuator of a system. The method includes the following steps:
  controlling the actuator within a time window if at least one state variable of the system is in a predefined operating range;
  detecting a system response, with the aid of a sensor, within the time window as a response to controlling the actuator;
  determining a malfunction of the actuator if the system response differs from a setpoint system response that is expected due to controlling the actuator;
a further actuator of the system being controlled during the time window in such a way that the at least one state variable of the system remains in the predefined operating range during the time window.

According to another aspect of the present invention, an example method is provided for checking a function of a sensor of a system. The method includes the following steps:
  controlling an actuator within a time window if at least one state variable of the system is in a predefined operating range;
  detecting a system response, with the aid of the sensor, within the time window as a response to controlling the actuator;
  determining a malfunction of the actuator or of the sensor if the system response differs from a setpoint system response that is expected due to controlling the actuator;
a further actuator of the system being controlled during the time window in such a way that the at least one state variable of the system remains in the predefined operating range during the time window.

One aspect of the present invention is that, when checking the function of an actuator or a sensor in the system by an additional active intervention into the system by at least one further actuator, for example in the form of regulation, it is ensured that the necessary conditions for reliably checking the function of the actuator or the sensor are maintained during a checking period. The check may thus be carried out more frequently or for a longer checking duration, so that the check results in more accurate, and therefore more robust, results. Overall, as a result of the additional active intervention the checking duration may be prolonged, so that it is also possible to increase the number of test cycles or, after the actuator is controlled, to take an extended recovery period into account before a measurement of the effects of an adjustment of the actuator is ascertained. In addition, the probability may be reduced that checks of the actuator or of the sensor have to be terminated when it is necessary to depart from the operating range required for this purpose. The frequency of starting a check of the actuator to be tested may thus be reduced, since on account of the increased robustness the number or the frequency of checks necessary for a decision regarding the check result may be reduced. It is thus also possible to carry out a greater number of various checks of functions of various actuators or sensors within the few phases of suitable operating conditions. In particular, negative influences of the check on the system may also be minimized, since the actuator does not have to be adjusted as much. As a whole, it is possible to wait for a longer period of time in order to detect the effects of the adjustment in the system, without increasing the probability of terminating the check when a departure is made from the operating range.

According to another aspect, a method is provided for calibrating an actuator of a system. The method includes the following steps:
- controlling the actuator within a time window if at least one state variable of the system is in a predefined operating range;
- detecting a system response, with the aid of a sensor, within the time window as a response to controlling the actuator;
- calibrating the actuator as a function of a difference between the system response and a setpoint system response that is expected due to controlling the actuator;

a further actuator being controlled during the time window in such a way that the at least one state variable of the system remains in the predefined operating range during the time window.

According to another aspect of the present invention, an example method is provided for calibrating a sensor of a system. The method includes the following steps:
- controlling an actuator within a time window if at least one state variable of the system is in a predefined operating range;
- detecting a system response, with the aid of the sensor, within the time window as a response to controlling the system component;
- calibrating the sensor as a function of a difference between the system response and a setpoint system response that is expected due to controlling the actuator;

a further actuator being controlled during the time window in such a way that the at least one state variable of the system remains in the predefined operating range during the time window.

According to one specific embodiment, it may be provided that the predetermined operating range is defined, as a function of the value of the at least one state variable of the system, at a point in time before the actuator is controlled, in particular the predetermined operating range indicating that the at least one state variable is to maintain the value at the point in time before the actuator is controlled.

In addition, the control of the further actuator may be carried out cyclically or at predetermined points in time within the time window.

In particular, the control of the further actuator may be carried out with the aid of a regulation, the regulation being carried out based on the at least one state variable.

Furthermore, the control of the actuator may be carried out by changing a control variable for controlling the actuator.

According to one specific embodiment, the measure of controlling the actuator may be selected in such a way that controlling the actuator in a proper system causes a system response which is detectable by the sensor.

For example, a swirl flap of an internal combustion engine, via which turbulence of an air-fuel mixture in an internal combustion engine is adjustable, may be provided as the actuator. In the operating range, the pressure ratio is set to a certain pressure ratio range via a throttle valve which controls the supply of air to the internal combustion engine, the throttle valve as a further actuator being controlled in order to keep the pressure ratio within the specified pressure ratio range during the time window, an intake manifold pressure and/or a fresh air mass flow of the internal combustion engine being ascertained as a system response in order to determine a malfunction of the swirl flap by determining a difference between the ascertained intake manifold pressure and/or the ascertained fresh air mass flow and a corresponding predefined setpoint value.

In another example, an exhaust gas cooler of an internal combustion engine in an exhaust gas recirculation line may be checked as a system component. The exhaust gas cooler is coupled to a bypass valve in order to adjust the portion of the exhaust gas flowing through the exhaust gas recirculation line which flows through the exhaust gas cooler. In the operating range, a mass flow flowing over the exhaust cooler should be constant, for example an exhaust gas recirculation valve as a further actuator for controlling a gas flow in the exhaust gas recirculation line or the throttle valve being controlled for adjusting the constant mass flow through the exhaust cooler, an efficiency of the exhaust cooler being ascertained as a system response.

According to another aspect of the present invention, an example control unit is provided for checking a function of an actuator of a system. The control unit may be designed:
- to control the actuator within a time window if at least one state variable of the system is in a predefined operating range;
- to detect a system response, with the aid of a sensor, within the time window as a response to controlling the actuator;
- to determine a malfunction of the actuator if the system response differs from a setpoint system response that is expected due to controlling the system component;
- to control a further actuator of the system during the time window in such a way that the at least one state variable of the system remains in the predefined operating range during the time window.

According to another aspect of the present invention, an example control unit is provided for checking a function of a sensor of a system. The control unit may be designed:
- to control an actuator within a time window if at least one state variable of the system is in a predefined operating range;
- to detect a system response, with the aid of the sensor, within the time window as a response to controlling the actuator;
- to determine a malfunction of the actuator if the system response differs from a setpoint system response that is expected due to controlling the actuator;
- to control a further actuator of the system during the time window in such a way that the at least one state variable of the system remains in the predefined operating range during the time window.

According to another aspect of the present invention, an example control unit is provided for calibrating an actuator of a system. The control unit may be designed:
- to control the actuator within a time window if at least one state variable of the system is in a predefined operating range;

to detect a system response, with the aid of a sensor, within the time window as a response to controlling the actuator;

to calibrate the actuator as a function of a difference between the system response and a setpoint system response that is expected due to controlling the actuator;

to control a further actuator of the system during the time window in such a way that the at least one state variable of the system remains in the predefined operating range during the time window.

According to another aspect of the present invention, an example control unit is provided for calibrating a sensor of a system. The control unit may be designed:

to control an actuator within a time window if at least one state variable of the system is in a predefined operating range;

to detect a system response, with the aid of the sensor, within the time window as a response to controlling the actuator;

to calibrate the sensor as a function of a difference between the system response and a setpoint system response that is expected due to controlling the actuator;

to control a further actuator of the system during the time window in such a way that the at least one state variable of the system remains in the predefined operating range during the time window.

According to another aspect of the present invention, an example engine system having an internal combustion engine and the above control unit is provided.

BRIEF DESCRIPTION OF THE DRAWINGS

Preferred specific embodiments of the present invention are explained in greater detail below with reference to the figures.

FIG. 3 shows an engine system having multiple actuators which may be checked according to the method for checking the function of the actuators.

DETAILED DESCRIPTION OF EXAMPLE EMBODIMENTS

Figure 1:
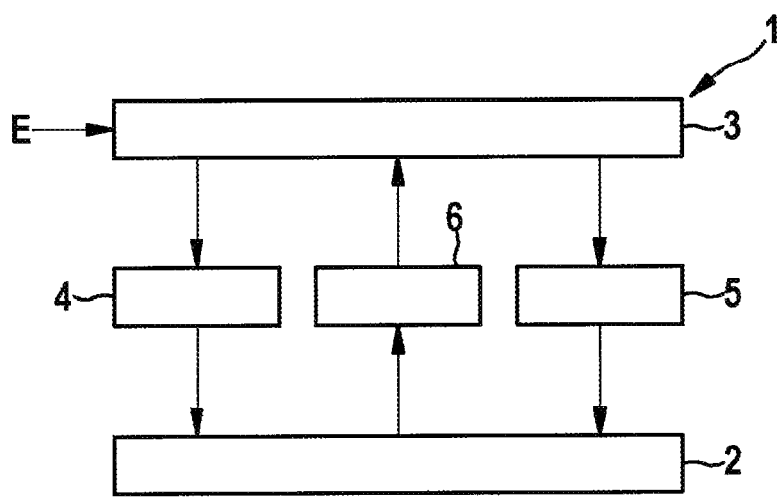
FIG. 1 shows a schematic illustration of a system having a system component to be tested, and having a control unit in which a check of the function of the system component to be tested is carried out.

FIG. 1 schematically illustrates a system 1 in which a physical system 2 such as an internal combustion engine, for example, is operated by a control unit 3. Control unit 3 acts on system 2 with the aid of a first actuator 4 and with the aid of one or multiple second actuators 5. With the aid of one or multiple sensors 6, sensor values may be ascertained, and thus states of system 2 (system states) may be detected and communicated to control unit 3, so that the control of actuators 4, 5, i.e., the operation of system 2, may be carried out in the form of a regulation, i.e., taking the system states into account.

The control of system 2 may be carried out according to defaults provided in control unit 3 and/or as a function of external defaults which are externally provided with the aid of a default variable E.

For engine systems having an internal combustion engine for use in motor vehicles, according to regulatory requirements the function of all or a part of the system components for which a malfunction may have an influence on the emission characteristics of the internal combustion engine must be checked. Also in other systems, it may be necessary to check the function of one or more of the system components. Furthermore, the behavior or the properties of individual system components may change due to aging or other influences. Thus, the transmission function of an actuator, i.e., the physical output variable of an actuator, for example the actuator travel (disc angle) of an adjustable valve, may change as a function of the control variable. In addition, the transmission function of a sensor which outputs a sensor value as a function of the variable to be measured may change over the lifetime of the sensor.

In most cases, checking the system component or ascertaining the transmission function of the system component should be carried out when the system is in operation, preferably without noticeably influencing the operating behavior of the system. At the same time, the transmission function may be checked or ascertained only during a quasi-steady-state operating state. Therefore, function checks or ascertainment of the transmission function is/are carried out only in certain state variable ranges of physical system 2. These state variable ranges thus define enabling conditions for carrying out the check or the ascertainment of the transmission function.

The state variable ranges may be value ranges in which the sensor values delivered by sensors 6, default variables E, as well as other variables and the like which indicate system states must be present in order to properly check the function of the system component and to ascertain the transmission function.

In the present case it is assumed, for example, that the function of first actuator 4 is to be checked. However, a common problem is that the operating range in which system 2 is operated changes during checking of first actuator 4, so that the predefined enabling conditions for carrying out the check of the function of first actuator 4 are no longer present. However, since checking the function requires a certain checking duration, the checking process must be terminated in cases in which, during the checking duration, a departure is made from the limits for the operating ranges which are predefined by the enabling conditions. The appropriate enabling conditions for checking the function of first actuator 4 must then once again be awaited. It is now proposed, with the aid of second actuator 5, to regulate the operating range defined by the enabling conditions in such a way that the operating range is maintained at least until the checking of first actuator 4 is completed.

Figure 2:
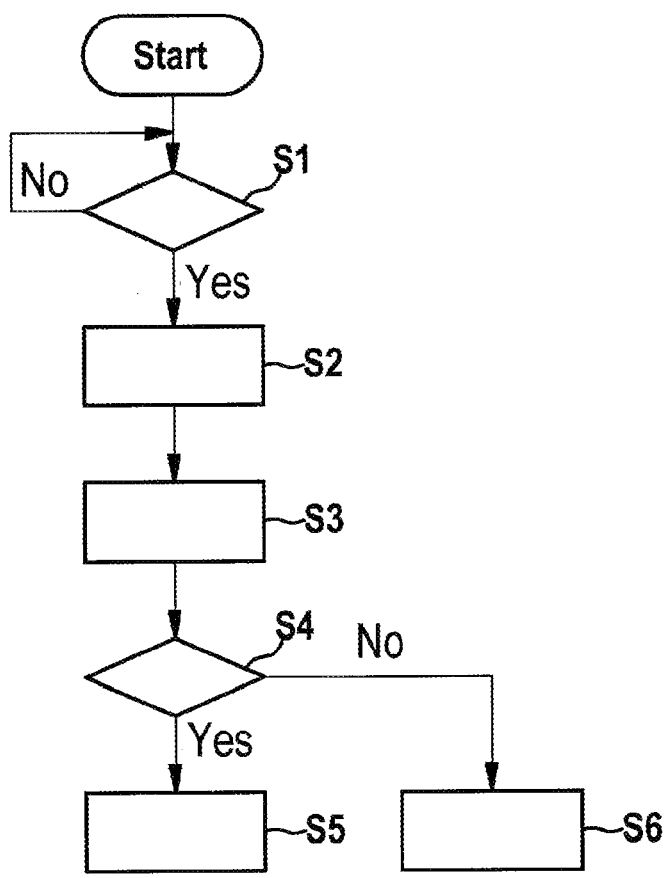
FIG. 2 shows a flow chart for illustrating the sequence of a method for checking the function of a system component to be tested.

FIG. 2 shows a flow chart for illustrating a method for checking the function of first actuator 4. A query is made in step S1 as to whether the enabling conditions for checking the function of first actuator 4 are met. As described above, the enabling conditions may define operating ranges of system 2, for example with the aid of state variables present within state variable ranges which are defined by the enabling conditions. For example, the sensor values provided by the sensors may be within certain sensor value ranges, and/or externally provided default variables E may be within defined default variable ranges. Only when this is the case (alternative: yes) is the checking started by adjusting first actuator 4 in step S2.

First actuator 4 is adjusted to a degree that is sufficient to determine an influence on system 2 with the aid of one or multiple sensors 6, but not to a degree that may result in a noticeable change in the system behavior, in particular a deterioration of the system behavior, for example a deterioration of the emission characteristics in engine systems. Thus, the degree of adjustment of first actuator 4 is a function of the physical circumstances, the type of first actuator 4, and the like. In practice, a compromise is generally made here between the influence on the system and the degree of adjustment of first actuator 4.

Since the influence of the adjustment of first actuator 4 on the system generally does not occur immediately, but instead occurs only after a response time or after a recovery period, initially a certain starting duration is awaited in step S3 before a check is made in step S4 as to whether a change in a system state has resulted from adjusting first actuator 4. The change in the system state is generally identified via a change in one or multiple sensor values of one or multiple sensors 6.

If it is determined in step S4 that a change in the system state has resulted (alternative: yes), it is signaled in step S5 that the function of checked first actuator 4 is correct. If no change in the system state is identified (alternative: no), a malfunctioning actuator 4 may be deduced. This may be signaled in step S6.

To ensure that the operating range of system 2, in which the enabling conditions for checking the function of first actuator 4 are present, is also present during the checking duration, it is possible, for example, to check these enabling conditions during the entire checking duration, at certain points in time in the sequence of the checking process, or only in certain phases of the checking process, for example in a preparation or recovery phase of step S2.

The system state may be influenced with the aid of one or more of second actuators 5 in order to further maintain the operating ranges which are necessary for meeting the enabling conditions. That is, for example, the state variables which are relevant for the presence of the enabling conditions may, with the aid of further actuators 5, be regulated to setpoint values which are within the state variable ranges. It may thus be ensured that the method for checking the function of first actuator 4 may be carried out over the entire checking duration, since a premature departure from the enabling conditions is counteracted with the aid of second actuators 5.

Of course, it cannot be ruled out that the effect of second actuators 5 which are used for checking the first actuator is not sufficient to ensure that the state variable which is relevant for the enabling condition is not able to keep the variable state ranges which are relevant for the enabling conditions in the range that is necessary for meeting the enabling conditions. In this case, the checking of the function of first actuator 4 is terminated, the same as in conventional checking processes.

If the checking for the presence of the enabling conditions and the adjustment of the relevant state variables to the setpoint values within the state variable ranges are carried out in phases or only at certain points in time, during the remaining time in which no regulation of the state variables which are relevant for the enabling conditions is carried out it may be provided that second actuators 5 are not adjusted, or that they are operated according to a predefined control. The parameters of the predefined control may be applied, or learned in a separate process.

The above method may similarly also be used for ascertaining transmission functions of sensors or actuators in order to carry out a balancing of the system component with the aid of the control unit, or a calibration of the system component. A transmission function corresponds to the relationship between a physical output variable, i.e., a measured variable which is to be measured by the sensor, or an output variable which is to be provided by an actuator, and a communicable variable which is provided in the system, for example an electrical control variable for the actuator, or a sensor variable which is provided by the sensor as a function of the output variable, for example in the form of an electrical signal, and which indicates a sensor value.

During the appropriate enabling condition which is required for ascertaining information concerning the transmission function, as the result of an intervention via second actuators 5 an attempt is then made to adjust the state variables to a setpoint value within the corresponding state variable range. This allows the transmission function to be ascertained.

FIG. 3 illustrates an engine system 10 having various actuators and sensors as an example of a physical system according to FIG. 1. Engine system 10 includes an internal combustion engine 11 having multiple cylinders 12 which may be supplied with air via an air supply system 13. A supercharger 14 in the form of an exhaust gas turbocharger is situated in air supply system 13 in order to provide air at a boost pressure $p_L$ in air supply system 13, upstream from a throttle valve 15 situated in air supply system 13.

The air is introduced via two intake valves 16 into each of cylinders 12 from air supply system 13, also referred to as the intake manifold, situated in the area upstream from throttle valve 15. A swirl flap 27, via which turbulence of the air-fuel mixture in cylinder 12 in question may be adjusted, may be situated in a supply line of at least one of intake valves 16 of each cylinder 12. Fuel is supplied to the engine system via an injector 30 in the intake manifold area of air supply system 13. Alternatively, fuel may be supplied to the engine system via injectors 30' in cylinders 12.

In addition, an exhaust system 17 is provided which leads through supercharger 14 in order to drive a compressor of supercharger 14 as a function of an exhaust gas enthalpy of the combustion exhaust gases.

An exhaust gas recirculation line 18 is provided between exhaust system 17 and air supply system 13, in particular in the area downstream from throttle valve 15, in order to convey a portion of the exhaust gas flowing through exhaust gas system 17 into air supply system 13, in particular in the area of the intake manifold. An exhaust gas recirculation valve 19 is provided in exhaust gas recirculation line 18, with the aid of which the proportion of the recirculated exhaust gas may be adjusted. Also provided in exhaust gas recirculation line 18 is an exhaust gas cooler 22 which is able to cool the combustion exhaust gas which passes through. A bypass line, in which a separately controllable bypass valve 23 is situated, is provided around exhaust gas cooler 22 in order to regulate the cooling of the combustion exhaust gas by exhaust gas cooler 22.

Engine system 10 shown in FIG. 3 is controlled with the aid of a control unit 20 as a function of an external default which indicates, for example, a driver input torque or a gas pedal position, and the actuators are controlled as a function of operating states of engine system 10. Operating states of internal combustion engine 11 may be detected directly with the aid of sensors, or may be deduced using suitable models.

The efficiency of supercharger 14 may be adjusted by regulating an exhaust gas turbine situated in the exhaust system. The exhaust gas turbine may be designed, for example, as an exhaust gas turbine having a variable turbine geometry which may be adjusted with the aid of control unit 20. Also located in exhaust system 17 is a lambda sensor 21, with the aid of which the stoichiometric composition of the combustion exhaust gas may be detected in the form of a lambda value. That is, it may be determined whether the air-fuel mixture combusted in cylinders 12 was too rich or too lean.

As an example of checking a function of an actuator in this engine system 10, initially the function of swirl flap 27 is checked. For this purpose, during a coasting phase, i.e., during an operating state of engine system 10 in which a negative torque acts on internal combustion engine 11, i.e., internal combustion engine 11 is driven by an external torque, the position of throttle valve 15 is adjusted to a critical pressure ratio. The critical pressure ratio corresponds to a pressure ratio between the boost pressure in the area upstream from throttle valve 15 and a pressure downstream from throttle valve 15, in which the speed of the air flowing over the throttle valve exceeds a certain limiting value. In particular, the limiting value of the flow rate is the speed of sound in air. During the function check, this pressure ratio is adjusted by control unit 20 with the aid of a suitable regulation of throttle valve 15. In this operating state of engine system 10, a change in an intake manifold pressure and/or in the fresh air mass flow may be determined by only a slight adjustment of swirl flap 27. If the influence on the intake manifold pressure and/or on the fresh air mass flow is present during an adjustment of swirl flap 27, it is concluded that swirl flap 27 is functional. In this example, the system component to be tested corresponds to swirl flap 27. In this example, the state variable corresponds to the position of throttle valve 15, and the enabling condition defines a state variable range in which the critical pressure ratio is achieved.

In another example, the efficiency of exhaust gas cooler 22, which is situated in exhaust gas recirculation line 18, may be checked by opening or closing bypass valve 23.

The proper functioning of bypass valve 23 may be determined by measuring a change in temperature as a function of the closing or opening of bypass valve 23. If there is no change in the temperature, it may be concluded that bypass valve 23 is defective. During checking of the function of bypass valve 23, the presence of an enabling condition is necessary in which the mass flow of the recirculated combustion exhaust gas through exhaust gas cooler 22 is constant. This may be achieved by setting the exhaust gas recirculation rate to a setpoint value, the exhaust gas recirculation rate being settable via throttle valve 15 and exhaust gas recirculation valve 19. In this example, the state variable to be adjusted thus corresponds to the exhaust gas recirculation rate.

If it is known that bypass valve 23 is operating properly, the efficiency of exhaust gas cooler 22 may also be determined based on the temperature drop that is ascertained when switching between states of bypass valve 23. The greater the change in temperature due to the opening/closing of previously closed/opened bypass valve 23, the higher the efficiency of exhaust gas cooler 22.

Thus, during checking of the functionality of bypass valve 23, or checking and determining the efficiency of exhaust gas cooler 22, control unit 20 may appropriately adjust throttle valve 15 and exhaust gas recirculation valve 19, resulting in a constant mass flow through exhaust gas cooler 22 during the checking duration.

In another example, balancing of the lambda sensor in coasting mode is used. As a necessary condition, the pressure at lambda sensor 21 must be constant. The balancing is carried out during operation of internal combustion engine 11 in coasting mode, in which fresh air is conveyed through cylinders 12 and into the exhaust gas discharge section. Lambda sensor 21, which provides information concerning the oxygen concentration of the gas flowing past it as information concerning the lambda value, is now to be balanced in such a way that it provides information concerning the oxygen concentration of fresh air. If the information concerning the oxygen concentration that is measured during the balancing differs from the known oxygen concentration of fresh air, the measured value of the oxygen concentration, i.e., the information concerning the lambda value, i.e., lambda sensor 21, may be correspondingly adapted, for example by applying an appropriate factor to the information concerning the lambda value prior to further processing.

The constant pressure in the area of lambda sensor 21 corresponds to the state variable, while the enabling condition defines that the pressure is to be held constant.

The pressure may be adjusted via the exhaust gas mass flow through supercharger 14 or through exhaust gas recirculation valve 19. Thus, control unit 20 provides that during the measurement of the oxygen concentration, i.e., the information concerning the lambda value, an exhaust gas recirculation rate corresponding to the pressure is to be set by adjusting the exhaust gas mass flow by appropriately changing the turbine geometry in supercharger 14 and/or by regulating exhaust gas recirculation valve 19. If deviations in the exhaust gas mass flow occur due to other influences on engine system 10, the exhaust gas mass flow may be set to be constant by control interventions on the turbine geometry and/or on exhaust gas recirculation valve 19.

In another example, a zero quantity calibration of an injector situated in a cylinder is carried out in an internal combustion engine having direct injection. One condition for this zero quantity calibration is that the internal combustion engine must be in coasting mode; i.e., the engine is driven by an external torque and does not generate its own drive torque. The zero quantity calibration is carried out by withdrawing a very small injection quantity (calibration injection quantity) which does not generate a torque that is noticeable to the driver of the motor vehicle but which may be detected by observing the rotational speed or the lambda value. However, for this purpose the fresh air mass flow into cylinders 12 must be constant, which may be set or regulated via throttle valve 15. Thus, the monitored state variable is the fresh air mass flow, and the enabling condition provides that the fresh air mass flow is set to be constant. That is, control unit 20 regulates the fresh air mass flow, i.e., the intake manifold pressure, to a constant value during the checking duration with the aid of the control of throttle valve 15.

According to other specific embodiments, the actuator to be tested may be adjusted over a certain path of motion or adjustment path. This may be achieved by appropriate parameterization of the checking process.

Furthermore, it may be provided that the path of motion of the actuator to be tested is adjusted as a function of a measure of the steady-state nature of the operating state. The measure of the steady-state nature of the operating state indicates how close a state variable or the state variables is/are to the limiting values of the state variable ranges defined by the enabling conditions. If there is a risk of departure from the state variable ranges, and thus, a risk that the enabling conditions are no longer met during the checking or during the balancing or the calibration, it may be signaled that the checking should be shortened. A robustness of the checking which is reduced in this way may accepted.

What is claimed is:

1. A method for checking a function of an actuator of a system, comprising:
   controlling the actuator within a time window if at least one state variable of the system is in a predefined operating range;
   detecting a system response, with the aid of a sensor, within the time window as a response to controlling the actuator;
   determining a malfunction of the actuator if the system response differs from a setpoint system response that is expected due to controlling the actuator; and controlling a further actuator of the system during the time window in such a way that the at least one state variable of the system remains in the predefined operating range during the time window, the control of the further actuator being carried out with the aid of a regulation, so that the predefined operating range is maintained until the checking of the actuator is completed.

2. A method for checking a function of a sensor of system, comprising:
controlling an actuator within a time window if at least one state variable of the system is in a predefined operating range;
detecting a system response, with the aid of the sensor, within the time window as a response to controlling the actuator;
determining a malfunction of one of the actuator or of the sensor if the system response differs from a setpoint system response that is expected due to controlling the actuator; and
controlling a further actuator of the system during the time window in such a way that the at least one state variable of the system remains in the predefined operating range during the time window, the control of the further actuator being carried out with the aid of a regulation, so that the predefined operating range is maintained until the checking of the actuator is completed.

3. A method for calibrating an actuator of a system, comprising:
controlling the actuator within a time window if at least one state variable of the system is in a predefined operating range;
detecting a system response, with the aid of a sensor, within the time window as a response to controlling the actuator;
calibrating the actuator as a function of a difference between the system response and a setpoint system response that is expected due to controlling the actuator; and
controlling a further actuator during the time window in such a way that the at least one state variable of the system remains in the predefined operating range during the time window, the control of the further actuator being carried out with the aid of a regulation, so that the predefined operating range is maintained until the checking of the actuator is completed.

4. A method for calibrating a sensor of a system, comprising:
controlling an actuator within a time window if at least one state variable of the system is in a predefined operating range;
detecting a system response, with the aid of the sensor, within the time window as a response to controlling the actuator;
calibrating the sensor as a function of a difference between the system response and a setpoint system response that is expected due to controlling the actuator; and
controlling a further actuator during the time window in such a way that the at least one state variable of the system remains in the predefined operating range during the time window, the control of the further actuator being carried out with the aid of a regulation, so that the predefined operating range is maintained until the checking of the actuator is completed.

5. The method as recited in claim 1, wherein the predetermined operating range is defined, as a function of the value of the at least one state variable of the system, at a point in time before the actuator is controlled, the predetermined operating range indicating that the at least one state variable is to maintain the value at the point in time before the actuator is controlled.

6. The method as recited in claim 2, wherein the predetermined operating range is defined, as a function of the value of the at least one state variable of the system, at a point in time before the actuator is controlled, the predetermined operating range indicating that the at least one state variable is to maintain the value at the point in time before the actuator is controlled.

7. The method as recited in claim 3, wherein the predetermined operating range is defined, as a function of the value of the at least one state variable of the system, at a point in time before the actuator is controlled, the predetermined operating range indicating that the at least one state variable is to maintain the value at the point in time before the actuator is controlled.

8. The method as recited in claim 4, wherein the predetermined operating range is defined, as a function of the value of the at least one state variable of the system, at a point in time before the actuator is controlled, the predetermined operating range indicating that the at least one state variable is to maintain the value at the point in time before the actuator is controlled.

9. The method as recited in claim 1, wherein the control of the further actuator is carried out one of cyclically or at predetermined points in time within the time window.

10. The method as recited in claim 2, wherein the control of the further actuator is carried out one of cyclically or at predetermined points in time within the time window.

11. The method as recited in claim 3, wherein the control of the further actuator is carried out one of cyclically or at predetermined points in time within the time window.

12. The method as recited in claim 4, wherein the control of the further actuator is carried out one of cyclically or at predetermined points in time within the time window.

13. The method as recited in claim 1, wherein the control of the actuator is carried out with the aid of a control variable, a measure of controlling the actuator being selected in such a way that controlling the actuator in a proper system causes a system response which is detectable by the sensor.

14. The method as recited in claim 2, wherein the control of the actuator is carried out with the aid of a control variable, a measure of controlling the actuator being selected in such a way that controlling the actuator in a proper system causes a system response which is detectable by the sensor.

15. The method as recited in claim 3, wherein the control of the actuator is carried out with the aid of a control variable, a measure of controlling the actuator being selected in such a way that controlling the actuator in a proper system causes a system response which is detectable by the sensor.

16. The method as recited in claim 4, wherein the control of the actuator is carried out with the aid of a control variable, a measure of controlling the actuator being selected in such a way that controlling the actuator in a proper system causes a system response which is detectable by the sensor.

17. A control unit for checking a function of an actuator of a system, the control unit configured to control the actuator within a time window if at least one state variable of the system is in a predefined operating range, to detect a system response, with the aid of a sensor, within the time window as a response to controlling the actuator, to determine a malfunction of the actuator if the system response differs from a setpoint system response that is expected due to controlling the actuator, to control a further actuator of the system during the time window in such a way that the at least one state variable of the system remains in the predefined operating range during the time window, and to carry out the control of the further actuator with the aid of a regulation, so that the predefined operating range is maintained until the checking of the actuator is completed.

18. A control unit for checking a function of a sensor of a system, the control unit configured to control an actuator within a time window if at least one state variable of the system is in a predefined operating range, to detect a system response, with the aid of the sensor, within the time window as a response to controlling the actuator, to determine a malfunction of the actuator if the system response differs from a setpoint system response that is expected due to controlling the actuator, to control a further actuator of the system during the time window in such a way that the at least one state variable of the system remains in the predefined operating range during the time window, and to carry out the control of the further actuator with the aid of a regulation, so that the predefined operating range is maintained until the checking of the actuator is completed.

19. A control unit for calibrating an actuator of a system, the control unit configured to control the actuator within a time window if at least one state variable of the system is in a predefined operating range, to detect a system response, with the aid of a sensor, within the time window as a response to controlling the actuator, to calibrate the actuator as a function of a difference between the system response and a setpoint system response that is expected due to controlling the actuator, to control a further actuator of the system during the time window in such a way that the at least one state variable of the system remains in the predefined operating range during the time window, and to carry out the control of the further actuator with the aid of a regulation, so that the predefined operating range is maintained until the checking of the actuator is completed.

20. A control unit for calibrating a sensor of a system, the control unit being configured to control an actuator within a time window if at least one state variable of the system is in a predefined operating range, to detect a system response, with the aid of the sensor, within the time window as a response to controlling the actuator, to calibrate the sensor as a function of a difference between the system response and a setpoint system response that is expected due to controlling the actuator, to control a further actuator of the system during the time window in such a way that the at least one state variable of the system remains in the predefined operating range during the time window, and to carry out the control of the further actuator with the aid of a regulation, so that the predefined operating range is maintained until the checking of the actuator is completed.

21. An engine system having an internal combustion engine and a control unit, the control unit configured to control the actuator within a time window if at least one state variable of the system is in a predefined operating range, to detect a system response, with the aid of a sensor, within the time window as a response to controlling the actuator, to determine a malfunction of the actuator if the system response differs from a setpoint system response that is expected due to controlling the actuator, to control a further actuator of the system during the time window in such a way that the at least one state variable of the system remains in the predefined operating range during the time window, and to carry out the control of the further actuator with the aid of a regulation, so that the predefined operating range is maintained until the checking of the actuator is completed.

* * * * *